United States Patent [19]

Konishi et al.

[11] Patent Number: 4,528,318

[45] Date of Patent: Jul. 9, 1985

[54] AQUEOUS COATING COMPOSITION, AND ITS PRODUCTION

[75] Inventors: Sakuichi Konishi, Ikoma; Naohito Shingo, Katano; Mathuo Shibayama, Ohtsu, all of Japan

[73] Assignee: Nippon Paint Co., Ltd., Osaka, Japan

[21] Appl. No.: 462,235

[22] Filed: Jan. 31, 1983

[30] Foreign Application Priority Data

Feb. 15, 1982 [JP] Japan ................................ 57-23157

[51] Int. Cl.³ .............................................. C08L 51/00
[52] U.S. Cl. .................................... 524/504; 524/507; 524/539; 525/63; 525/64; 525/66; 525/71; 525/78; 525/80; 525/131; 525/170; 525/440; 525/444
[58] Field of Search ............... 524/507, 539, 504; 525/440, 444, 63, 64, 66, 71, 78, 80, 131, 170

[56] References Cited

FOREIGN PATENT DOCUMENTS 156767 1/1981 Japan .

*Primary Examiner*—Joseph L. Schofer
*Assistant Examiner*—J. M. Reddick
*Attorney, Agent, or Firm*—Wenderoth, Lind & Ponack

[57] ABSTRACT

An aqueous coating composition which comprises an aqueous resin having a carboxyl group (I) and a water-insoluble resin powder (II), the aqueous resin (I) being the one dispersible or soluble into an aqueous medium by ionization when the carboxyl group is neutralized with a basic substance, and the water-insoluble resin powder (II) being the one of 5 to 100 in acid value obtained by reaction between a carboxyl group-containing resin of 20 to 300 in acid value in a solid state at room temperature and a monoepoxy compound or a monoisocyanate compound.

3 Claims, No Drawings

AQUEOUS COATING COMPOSITION, AND ITS PRODUCTION

The present invention relates to an aqueous coating composition, and its production. More particularly, it relates to an aqueous coating composition comprising an aqueous resin and a water-insoluble resin powder, which is excellent in storage stability and application property and can provide a coating film having favorable physical properties such as high water resistance and high blister resistance, and its production.

An aqueous coating composition is advantageous in not causing environmental pollution and also in saving natural and artificial resources, because the volatile component therein mainly consists of water and contains, if any, a very small amount of an organic solvent(s). Further, such composition has a high safety to firing and gives no harmful influence to human bodies on handling in a series of operations from the production to the application. Due to these reasons, it is nowadays widely used in place of a solvent type coating composition.

On production of an aqueous coating composition, it is necessary to make a resin as the film-forming component hydrophilic. For this purpose, there is frequently adopted a procedure for dispersing (or dissolving) an aqueous resin into water by ionizing the carboxyl group present in the resin with a basic substance. In this case, the carboxyl group tends to remain in the coating film formed by the use of the resulting aqueous coating composition, and as the result, the performances of the coating film such as water resistance become insufficient.

In order to solve the above problem, there was provided a coating composition which comprises as the film-forming component the said aqueous resin and a water-insoluble resin powder made of a melt mixture comprising an epoxy resin and a carboxyl group-containing resin (Japanese Patent Application No. 156767/1981). However, such composition is apt to be deteriorated in its performances during the storage, particularly at a higher temperature. When the deteriorated composition is applied onto a substrate, sags, craters, blisters, etc. are produced, whereby the application property is lowered.

As a result of the extensive studies, it has now been found that the use of a resin of 5 to 100 in acid value obtained by the reaction between a carboxyl group-containing resin of 20 to 300 in acid value in a solid state at room temperature and a monoepoxy compound or a monoisocyanate compound as the water-insoluble resin powder in the above composition can overcome the said drawbacks.

According to the present invention, there is provided an aqueous coating composition which comprises an aqueous resin (I) and a water-insoluble resin powder (II) as the film-forming components, the aqueous resin (I) being made aqueous by ionization resulting from neutralization of the carboxyl group present therein with a basic substance, and the water-insoluble resin powder (II) being a resin of 5 to 100 in acid value obtained by the reaction between a carboxyl group-containing resin of 20 to 300 in acid value in a solid state at room temperature and a monoepoxy compound or a monoisocyanate compound.

The aqueous resin (I) may be any resin having a carboxyl group, which is dispersible (or soluble) in an aqueous medium by ionization resulting from neutralization of the carboxyl group present therein with a basic substance. Specific examples of the aqueous resin (I) are alkyd resins, polyester resins, maleinated oil resins, maleinated polyalkadienes, acrylic resins, urethane resins, etc. The carboxyl group in those resins may be introduced by various conventional procedures. In case of alkyd resins and polyester resins, for instance, the carboxyl group can be introduced at the reaction between a polybasic acid (e.g. phthalic acid, phthalic anhydride, isophthalic acid, terephthalic acid, hexahydrophthalic acid, tetrahydrophthalic acid, trimellitic acid, malonic acid, succinic acid, glutaric acid, adipic acid, azelaic acid, sebacic acid, dimeric acid) and a polyvalent alcohol (e.g. glycerol, trimethylolethane, trimethylolpropane, pentaerythritol, tris-2-hydroxyethyl isocyanurate, ethylene glycol, lower polyethylene glycol, propylene glycol, lower polypropylene glycol, butylene glycol, hexylene glycol, neopentyl glycol) to give the aqueous resin. In case of maleinated oil resins, a drying oil (e.g. linseed oil, castor oil, soybean oil, tung oil) may be reacted with maleic anhydride so as to give the aqueous resin having a carboxyl group. In case of maleinated polyalkadiene resins, polybutadiene (e.g. 1,2-polybutadine, 1,4-polybutadiene), polyisoprene or polycyclopentadiene may be reacted with an unsaturated carboxylic acid or its anhydride (e.g. maleic anhydride, hymic anhydride, fumaric acid, itaconic acid) to give an aqueous resin having a carboxyl group. In case of epoxy resins, the reaction product between bisphenol A and epichlorhydrin is a typical example, and it may be per se water-dispersible or made water-dispersible by introduction of an acidic group into the oxirane group. In case of acrylic resins, there may be chosen any polymer, which can be made water-dispersible by treatment with a basic compound, from the reaction products of α,β-unsaturated carboxylic acids or their anhydrides (e.g. acrylic acid, methacrylic acid, cinnamic acid, crotonic acid, fumaric acid, citraconic acid, maleic anhydride) with acrylic esters (e.g. methyl acrylate, ethyl acrylate, propyl acrylate, butyl acrylate, hexyl acrylate, lauryl acrylate) and/or methacrylic esters (e.g. methyl methacrylate, ethyl methacrylate, propyl methacrylate, butyl methacrylate, hexyl methacrylate, lauryl methacrylate) and optionally with other polymerizable monomers. In case of urethane resins, a water-dispersible resin of base neutralization type having units of a diisocyanate compound (e.g. hexamethylene diisocyanate, tolylene diisocyanate, 4,4'-diphenylmethane diisocyanate, xylylene diisocyanate, 4,4'-methylenebis(cyclohexylisocyanate), isophorone diisocyanate) as the fundamental structure is usable. Thus, those may be prepared, for instance, by reacting said diisocyanate compound with a polyester, alkyd or acrylic compound or resin having a carboxyl group and any other functional group (e.g. hydroxyl).

The dispersion (or solubilization) of the said carboxyl group-containing resin into water may be also achieved by neutralizing the carboxyl group with a basic compound, of which examples are monomethylamine, dimethylamine, trimethylamine, monoethylamine, diethylamine, triethylamine, monoisopropylamine, diisopropylamine, diethylenetriamine, ethylenetriamine, triethylenetetramine, monoethanolamine, diethanolamine, triethanolamine, monoisopropanolamine, diisopropanolamine, dimethylethanolamine, morpholine, methylmorpholine, piperazine, ammonia, sodium hydroxide, potassium hydroxide, lithium hydroxide, etc.

Also, the aqueous resin (I) may be the one which can be dispersed (or dissolved) into an aqueous medium in the presence of any stabilizing substance which has a carboxyl group and can be ionized by neutralization of the carboxyl group to be dispersed into an aqueous medium. Examples of the stabilizing substance are carboxyl group-containing oligomers and polymers of alkyl resins, acrylic resins, urethane resins, etc. In other words, the aqueous resin (I) may be the one dispersed in an aqueous medium such as water or its mixture with any water-miscible organic solvent, which is obtainable by emulsion polymerization or mechanical action in the presence of the said stabilizing substance.

The aqueous resin (I) or any composition system comprising the same may include any dispersing (or solubilizing) aid to enhance the dispersibility (or solubility) of the aqueous resin (I). A typical example of such aid is any material bearing a hydrophilic group such as hydroxyl.

In order to assure the better dispersion stability and application property of the coating composition and the favorable chemical and physical properties of the coating film, the aqueous resin (I) is practically desirable to have an acid value of 20 to 200, a number average molecular weight of 500 to 30,000 (preferably 700 to 5,000), a water tolerance of not less than 4 times and a surface tension of not more than 51 dyne/cm (determined on 1% by weight solution).

Still, the aqueous resin (I) may have, in addition to the hydrophilic functional group such as carboxyl, any other functional group which is available for crosslinking by condensation, addition, cyclization, etc. Examples of such other functional group are sulfonate groups, phosphate groups, hydroxyl groups, active methylol groups, amino groups, reactive carbon-carbon unsaturated bonds, blocked isocyanate groups, halo groups, etc. The introduction of these functional groups may be achieved by conventional procedures as in the case of the introduction of carboxyl groups.

The water-insoluble resin powder (II) as the other essential component in the coating composition of the invention may be the one of 5 to 100 in acid value obtained by the reaction between a carboxyl group-containing resin of 20 to 300 in acid value in a solid state at room temperature and a monoepoxy compound or a monoisocyanate compound.

Examples of the carboxyl group-containing resin having an acid value of 20 to 300 are polyester resins, acrylic resins, etc. More specifically, the polyester resins may be the one obtained by subjecting a polybasic acid and a polyvalent alcohol as specifically exemplified above to polycondensation in a conventional procedure until the desired acid value and the solid state at room temperature are obtained. Further, the carboxyl group-containing resin may be obtained by copolymerizing an unsaturated polyester resin with the said $\alpha,\beta$-unsaturated carboxylic acid. In case of acrylic resins, the said $\alpha,\beta$-unsaturated carboxylic acid and an acrylic ester and/or a methacrylic ester, when desired, with any other polymerizable monomer may be subjected to copolymerization until the desired acid value and the solid state at room temperature are obtained.

The thus obtained carboxyl group-containing resin is then reacted with an monoepoxy compound or a monoisocyanate compound to obtain a carboxyl group-containing resin of 5 to 100 in acid value in a solid state at room temperature. On the reaction, the starting resin may be employed in the form of reaction mixture, i.e. a solution form, or when obtained in a solid state, in a melt form or a solution form in an appropriate solvent. The reaction is usually carried out in the presence of a catalyst such as an amine or an organic phosphorus compound at a temperature of 100 to 220° C. for a period of 15 minutes to 3 hours, preferably of 30 minutes to 1 hour, until the desired acid value is obtained. After completion of the reaction, the produced resin may be recovered from the reaction mixture by a conventional separation procedure. The amount of the monoepoxy compound or the monoisocyanate compound to be used may be from 1 to 1.5 equivalents, preferably from 1 to 1.4 equivalents, to that necessitated for obtaining the desired acid value.

Specific examples of the monoepoxy compound are olefin oxides, octylene oxide, butyl glycidyl ether, glycidyl methacrylate, glycidyl p-tert-butylbenzoate, allyl glycidyl ether, glycidyl tert-alkanoates (e.g. "Cardula E" manufactured by Shell Chem. Co.), styrene oxide, phenyl glycidyl ether, p-butylphenol glycidyl ether, cresyl glycidyl ether, 3-pentadecylphenyl glycidyl ether, cyclohexenevinyl monooxide, dipentene monooxide, dipentene monnooxide, $\alpha$-pinene oxide, glycidol, etc. Typical examples of the monoisocyanate compound are aromatic or aliphatic isocyanates (e.g. ethyl isocyanate, phenyl isocyanate).

The thus obtained resin may be subjected to pulverization by a conventional procedure to make fine powder of not more than 100 microns, preferably of not more than 50 microns, whereby the water-insoluble resin powder (II) is obtained. When desired, any additive such as a curing agent (e.g. an epoxy resin, an amino resin, a blocked polyisocyanate resin), a pigment, a modifier, a dispersing agent or a levelling agent may be melt blended therein.

In the coating composition of the invention, the weight proportion of the aqueous resin (I) and the water-insoluble resin powder (II) is usually from 2:98 to 98:2, preferably from 40:60 to 98:2, in terms of solid component. When the amount of the aqueous resin (I) is smaller than the said lower limit, the smoothness of the coating film formed thereby is inferior.

While the coating composition comprises as the medium water, preferably deionized water, it may additionally comprise a small amount of an organic solvent(s). Examples of such organic solvent are ethyleneglycol monomethylether, ethyleneglycol monoethylether, ethyleneglycol monobutylether, methanol, ethanol, isopropanol, n-butanol, sec-butanol, tert-butanol, dimethylformamide, etc.

Also, the coating composition may comprise any additive(s) such as a curing agent, a pigment, a modifier or a dispersant, when desired.

For preparation of the coating composition, the above essential and optional components may be combined in an optional order and mixed well by a conventional procedure. For instance, a varnish comprising the aqueous resin (I) may be admixed with the water-insoluble resin powder (II) and a pigment and, if necessary, further with any other optional component. Further, for instance, a portion of a varnish comprising the aqueous resin (I) may be admixed with a pigment to give a pigment paste, which is then admixed with a dispersion of the water-insoluble resin powder (II) in the remaining portion of the varnish.

The thus prepared coating composition may be applied onto a substrate by a per se conventional procedure such as air spraying, airless spraying, electrostatic spraying, roll coating, brush coating or dip coating.

The coating composition of the invention has good storage stability and maintains favorable application property even after storage over a long period of time, particularly at a higher temperature. It can be used for formation of a primer surface or an anticorrosive primer coat, etc. on the surfaces of vehicles such as automobiles.

Practical and presently preferred embodiments of the invention are illustratively shown in the following Examples wherein part(s) and % are by weight, unless otherwise indicated.

REFERENCE EXAMPLE 1

Preparation of water-insoluble resin powder (II-1):

In a flask, a polyester resin in a solid state at room temperature (acid value, 55.0 (in terms of solid resin); softening point, 85° C.; hydroxyl value, 0; weight average molecular weight (Mw), 12,200; number average molecular weight (Mn), 4,000) (100 parts) and butyl glycidyl ether ("Epiol B" manufactured by Nippon Oil and Fats Co., Ltd.) (7.15 parts) were charged and melted. Dimethylbenzylamine (0.8 part) as the catalyst was added thereto. Stirring was continued at 150° C. for 1 hours, whereby the reaction proceeded. The content was taken out from the flask and cooled to give an epoxy-modified polyester resin having an acid value of 21.5 in a solid state at room temperature.

The epoxy-modified polyester resin (100 parts) and an epoxy resin ("Epicoat 1004" manufactured by Shell Chem. Corp.) (71.4 parts) were melt blended and, after cooling, pulverized, followed by sieving to give fine resin powder of not more than 50 microns in maximum particle size (water-insoluble resin powder (II-1)).

REFERENCE EXAMPLE 2

Preparation of water-insoluble resin powder (II-2):

In the same manner as in Reference Example 1 but using "Cardula E" (manufactured by Shell Chem. Corp.) (15.6 parts) as the monoepoxy compound, there was prepared fine resin powder of not more than 50 microns in maximum particle size having an acid value of 22.1 (water-insoluble resin powder (II-2)).

REFERENCE EXAMPLE 3

Preparation of water-insoluble resin powder (II-3):

In the same manner as in Reference Example 1 but using glycidyl p-tert-butylbenzoate ("PES 10" manufactured by Fuso Chemical Co.) (20.5 parts) as the monoepoxy compound, there was prepared fine resin powder of not more than 50 microns in maximum particle size having an acid value of 20.9 (water-insoluble resin powder (II-3)).

REFERENCE EXAMPLE 4

Preparation of water-insoluble resin powder (II-4):

In the same manner as in Reference Example 2 but using an acrylic resin (acid value, 58; softening point, 83° C.; Mw, 120,000; Mn 5,300; monomeric composition, methyl methacrylate : acrylic acid : styrene : n-butyl methacrylate=40:7.5:32.5:20 by weight) in place of the polyester resin, there was prepared fine resin powder of not more than 50 microns in maximum particle size having an acid value of 23.2 (water-insoluble resin powder (II-4)).

REFERENCE EXAMPLE 5

Preparation of water-insoluble resin powder (II-5):

In the same manner as in Reference Example 1 but using phenyl isocyanate (10.2 parts) in place of the monoepoxy compound and dibutyl tin laurate (0.8 part) as the catalyst, the reaction was carried out at 180° C. for 4 hours to give fine resin powder of not more than 50 microns in maximum particle size having an acid value of 21.2 (water-insoluble resin powder (II-5)).

REFERENCE EXAMPLE 6

Preparation of water-insoluble resin powder (II-6):

In the same manner as in Reference Example 1 but using glycidol (manufactured by Daicel Ltd.) (2.60 parts) as the monoepoxy compound, there was prepared fine resin powder of not more than 50 microns in maximum particle size having an acid value of 32.1 (water-insoluble resin powder (II-6)).

EXAMPLE 1

The water-insoluble resin powder (II-1) (12.0 parts), a varnish of the aqueous resin (I) as shown in Table 1 (28.5 parts) and water (3.4 parts) were mixed together and stirred at 70° to 75° C. to give a dispersion. Separately, a pigment (20.5 parts) and a varnish of the aqueous resin (I) (28.5 parts) were mixed in the presence of glass beads to give another dispersion. The said two dispersions were admixed with a melamine resin ("Cymel 303" manufactured by American Cyanamid) (7.1 parts) to give an aqueous coating composition.

A portion of the obtained aqueous coating composition was immediately applied onto a substrate. Separately, the other portion was stored at 40° C. for a certain period of time and applied in the same manner as above onto a substrate. Measurement was made on the minimum film thickness for production of pinholes and the blister resistance. The results are shown in Table 2.

The coating was carried out according to a conventional procedure. The above coating composition was diluted with water to make a viscosity of 30 seconds in No. 4 Ford Cup and applied onto a bright iron plate (JIS G-3141) of 100×300×0.8 mm by spraying, followed by baking at 150° C. for 30 minutes. The minimum film thickness for production of pinholes was measured.

The blister resistance was evaluated by applying the coating composition onto a zinc phosphate treated steel plate to make a film thickness of 30 microns, dipped in deionized water of 40° C. for 240 hours and subjected to appearance observation. The evaluation was made on the following criteria: good, no abnormality; not good, remarkable blister production.

EXAMPLES 2 TO 9

In the same manner as in Example 1 using the water-insoluble resin powder (II) obtained in any of Reference Examples and the aqueous resin (I) varnish, there were obtained the results as shown in Table 2.

COMPARATIVE EXAMPLE 1

In the same manner as in Reference Example 1, non-modified polyester resin (100 parts) and "Epicoat 1004" (71.4 parts) were melt blended and pulverized to give fine resin powder. In the same manner as in Example 1 but using the above obtained water-insoluble resin powder, there was obtained an aqueous coating composition. The results with the coating composition are shown in Table 2.

TABLE 1

| Varnish No. | Kind of resin | Water tolerance*1 (time) | Surface tension*2 (dyne/cm) | Acid value | Hydroxyl value | Basic compound | Neutralization rate (%) | Solid resin content (wt %) | Molecular weight | Oil length |
|---|---|---|---|---|---|---|---|---|---|---|
| 1 | Alkyd resin | 10> | 42 | 55 | 36 | DMEA*3 | 80 | 31 | 1360 | 43 |
| 2 | Maleinated linseed oil | 10> | 46 | 62 | 61 | DMEA | 80 | 28 | 1300 | 55 |
| 3 | Polyester resin | 5 | 48 | 10 | 100 | DMEA | 100 | 46 | 1500 | — |
| 4 | Acrylic resin | 10> | 40 | 69 | 60 | DMEA | 100 | 68 | 7000 | — |

Note:
*1 Aqueous resin solution (5 g) was charged in a 100 ml volume beaker and diluted with deionized water. Numeral indicates the times of dilution at which No. 26 American point system letter could not be read through the beaker.
*2 Aqueous resin solution was diluted with deionized water to make a 1% by weight solution, which was used for measurement by the aid of a surface tension tester Model CB-VP manufactured by Kyowa Kagaku.
*3 Diethylethanolamine.

TABLE 2

| | Example | | | | | | | | | Comparative |
|---|---|---|---|---|---|---|---|---|---|---|
| | 1 | 2 | 3 | 4 | 5 | 6 | 7 | 8 | 9 | 1 |
| Water-insoluble resin powder No. | II-1 | II-2 | II-3 | II-4 | II-5 | II-1 | II-2 | II-3 | II-6 | — |
| Varnish No. | 1 | 1 | 1 | 1 | 1 | 2 | 3 | 4 | 1 | 1 |
| (amount; part(s)) | 57.0 | 57.0 | 57.0 | 57.0 | 57.0 | 59.0 | 38.0 | 26.0 | 57.0 | 57.0 |
| Limit of film thickness producing no pinhole (μ) | | | | | | | | | | |
| After preparation | 55 | 50 | 60 | 55 | 50 | 50 | 52 | 48 | 60 | 55 |
| After 7 days | 50 | 50 | 60 | 50 | 50 | 50 | 50 | 45 | 60 | 20 |
| After 20 days | 45 | 40 | 55 | 50 | 45 | 43 | 44 | 40 | 55 | 15< |
| After 30 days | 40 | 38 | 50 | 45 | 40 | 38 | 40 | 37 | 50 | — |
| Blister resistance | | | | | | | | | | |
| After preparation | Good | Good | Good | Good | Good | Good | Good | Good | Good | Good |
| After 10 days | Good | Good | Good | Good | Good | Good | Good | Good | Good | Good |
| After 15 days | Good | Good | Good | Good | Good | Good | Good | Good | Good | Not good |

What is claimed is:

1. An aqueous coating composition which comprises (I) a water dispersible or water soluble resin containing carboxy groups in its structure, said resin selected from the group consisting of an alkyd resin, a polyester resin, a maleinated oil resin, a maleinated polyalkadiene, an acrylic resin and a urethane resin, which resin has an acid value of 20 to 200 and a number average molecular weight of 500 to 30,000 and is rendered dispersible or soluble in an aqueous medium by ionization, when the carboxyl group is neutralized with a basic substance, and (II) a water-insoluble resin powder having an acid value of 5 to 100 obtained by the reaction between a carboxyl group-containing resin selected from the group consisting of a polyester resin and an acrylic resin having an acid value of 20 to 300 in a solid state at room temperature and a monoepoxy compound selected from the group consisting of olefin oxides, octylene oxide, butyl glycidyl ether, glycidyl methacrylate, glycidyl p-tert-butylbenzoate, allyl glycidyl ether, a glycidyl tert-alkanoate, styrene oxide, phenyl glycidyl ether, p-butyl-phenol glycidyl ether, cresyl glycidyl ether, 3-pentadecylphenyl glycidyl ether, cyclohexenevinyl monooxide, dipentene monooxide, alpha-pinene oxide and glycidol or a monoisocyanate compound selected from the group consisting of an aromatic isocyanate and an aliphatic isocyanate, said reaction being conducted in the presence of a catalyst, and wherein the weight proportion of the aqueous resin (I) and the water-insoluble resin powder (II) is from 2:98 to 98:2.

2. The aqueous coating composition according to claim 1, wherein the weight proportion is from 40:60 to 98:2.

3. The aqueous coating composition according to claim 1 wherein the aqueous resin (I) is a polyester resin and the water-insoluble resin powder (II) is a resin powder having an acid value of 5 to 100 and being prepared by the reaction between a polyester resin of 20 to 300 in acid value in a solid state at room temperature, and a monoepoxy compound.

* * * * *